United States Patent
Chang

(10) Patent No.: US 10,011,038 B2
(45) Date of Patent: Jul. 3, 2018

(54) WORKING HEIGHT ADJUSTMENT DEVICE OF PROCESSING MACHINE

(71) Applicant: KINGSAND MACHINERY LTD., Taichung (TW)

(72) Inventor: Chin-Feng Chang, Taichung (TW)

(73) Assignee: Kingsand Machinery Ltd., Taichung (TW)

( * ) Notice: Subject to any disclaimer, the term of this patent is extended or adjusted under 35 U.S.C. 154(b) by 281 days.

(21) Appl. No.: 15/054,069

(22) Filed: Feb. 25, 2016

(65) Prior Publication Data
US 2017/0246757 A1 Aug. 31, 2017

(51) Int. Cl.
| B27C 1/14 | (2006.01) |
| F16B 37/08 | (2006.01) |
| F16M 11/18 | (2006.01) |
| B24B 41/02 | (2006.01) |
| F16H 7/08 | (2006.01) |
| F16B 7/08 | (2006.01) |
| B23Q 16/00 | (2006.01) |
| F16H 7/14 | (2006.01) |

(52) U.S. Cl.
CPC ............ B27C 1/14 (2013.01); B24B 41/02 (2013.01); F16B 37/0857 (2013.01); F16M 11/18 (2013.01); B23Q 16/001 (2013.01); F16B 37/08 (2013.01); F16H 7/14 (2013.01); F16H 2007/088 (2013.01); F16H 2007/0891 (2013.01)

(58) Field of Classification Search
CPC .......... B37C 1/14; B24B 41/02; F16M 11/18; F16B 37/0857; F16B 37/0864; F16B 37/08; F16H 7/14; F16H 2007/088; F16H 2007/0891; B23Q 16/001; B25B 5/10

USPC .......................... 248/656, 666, 667; 411/433
See application file for complete search history.

(56) References Cited

U.S. PATENT DOCUMENTS

| 422,361 | A | * | 3/1890 | Alton | F16B 37/0864 411/433 |
| 2,671,482 | A | * | 3/1954 | Gordon | B25B 1/125 269/182 |
| 2,874,006 | A | * | 2/1959 | Sloyan | F16H 7/14 384/29 |
| 2,967,688 | A | * | 1/1961 | Sachers | F16H 7/14 248/657 |
| 3,393,598 | A | * | 7/1968 | Bettinger | F16B 37/0857 122/406.1 |
| 3,570,836 | A | * | 3/1971 | Pettavel | B25B 1/125 269/181 |

(Continued)

*Primary Examiner* — Stanton L Krycinski
*Assistant Examiner* — Taylor L Morris
(74) *Attorney, Agent, or Firm* — Raymond Y. Chan; David and Raymond Patent Firm

(57) ABSTRACT

A working height adjustment device of a processing machine includes a retaining frame, a slide seat, and a lever having a connecting rod pivoted between the retaining frame and the slide seat. An adjustment seat of the slide seat has an accommodation hole. The accommodation hole is provided with an elastic member, a movable member, and an eccentric rod. The movable member has an engaging hole. The engaging hole has a diameter greater than that of a micro adjustment screw rod. The engaging hole has a toothed portion. Thereby, the eccentric rod is turned to push or release the movable member for the toothed portion of the engaging hole to engage with or disengage from a threaded section of the micro adjustment screw rod, such that the micro adjustment screw rod is tuned or the lever is pulled up and down to adjust the cutter seat quickly.

8 Claims, 9 Drawing Sheets

(56) References Cited

U.S. PATENT DOCUMENTS

| | | | | |
|---|---|---|---|---|
| 4,143,868 A * | 3/1979 | Bergman | B23Q 1/38 269/20 |
| 4,500,304 A * | 2/1985 | Foster | F16H 7/1236 474/110 |
| 4,604,079 A * | 8/1986 | Parrish | F16H 7/14 248/666 |
| 4,631,044 A * | 12/1986 | Redmon | F16H 7/02 248/656 |
| 4,708,320 A * | 11/1987 | Hodges | B25B 25/00 254/129 |
| 4,787,794 A * | 11/1988 | Guthrie | F16B 7/14 269/181 |
| 4,858,387 A * | 8/1989 | Clough | B24B 41/02 451/143 |
| 5,314,386 A * | 5/1994 | Eide | F16H 7/14 474/150 |
| 5,868,538 A * | 2/1999 | Rathbun | D01H 7/16 411/433 |
| 5,897,109 A * | 4/1999 | Lin | B25B 5/10 269/182 |
| 5,898,974 A * | 5/1999 | Boyer | F16B 37/0857 16/114.1 |
| 6,523,799 B2 * | 2/2003 | Su | G03B 21/145 248/404 |
| 6,705,581 B2 * | 3/2004 | Trago | F16H 7/14 248/656 |
| 6,789,986 B2 * | 9/2004 | Story, Jr. | B23Q 1/01 408/14 |
| 8,206,072 B2 * | 6/2012 | Wagner | F16B 37/0821 24/132 AA |
| 8,471,133 B1 * | 6/2013 | Lin | G10D 13/06 84/421 |
| 8,721,479 B2 * | 5/2014 | Hoeting | F16H 7/14 192/56.1 |
| 2004/0113030 A1 * | 6/2004 | Wang | E04C 3/005 248/146 |
| 2016/0089762 A1 * | 3/2016 | Chuang | B24B 27/02 451/184 |

\* cited by examiner

WORKING HEIGHT ADJUSTMENT DEVICE OF PROCESSING MACHINE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a working height adjustment device of a processing machine, and more particularly to a processing machine which can be switched for a fine adjustment or a rapid adjustment.

Description of Related Arts

The height of a cutter seat provided on a woodworking processing machine, such as a wood planing machine, a grinding machine, and the like, needs to be adjusted according to the thickness of the wood to be proceeded. As shown in FIG. 1, a conventional woodworking processing machine 10 comprises side protruding boards 111 at two inner sides of a retaining frame 11. Two sides of a slide seat 13 are provided with rail grooves 131. In cooperation with bolts passing through the side protruding boards 111 and the rail grooves 131, the slide seat 13 is coupled to the retaining frame 11. The slide seat 13 can be slid up and down relative to the retaining frame 11. One side of the slide seat 13 is coupled with a connecting end 141 of a cutter seat 14, and another opposing side of the slide seat 13 is coupled with a motor 15. A turning axle of the motor 15 passes through a penetrating hole 133 of the retaining frame 11 to connect with a coupling member 142 of the cutter seat 14 to turn, such that the cutter seat 14 and the motor 15 are simultaneously moved up and down along with the slide seat 13. A top central portion of the slide seat 13 is provided with an adjustment seat 132. The adjustment seat 132 is pivotally connected with a micro adjustment screw rod 16 having a threaded section 161. An upper end of the micro adjustment screw rod 16 extends out of the retaining frame 11 and is pivotally connected with a rotatable handle 17. By turning the rotatable handle 17, the slide seat 13 can be ascended or descended, enabling the cutter seat 14 to move up or down so as to adjust the distance between the cutter seat 14 and a working platform 12 for the wood in a different size or thickness. However, if the difference in size between the former wood and the latter wood to be processed is great, the slide seat 13 is slowly moved by turning the rotatable handle 17 to link the micro adjustment screw rod 16. The speed to ascend or descend the slide seat 13 is slow and consumes energy and time. This is not convenient for use. In view of this, it is necessary to improve the processing machine 10 for a timesaving and convenient adjustment. Accordingly, the inventor of the present invention has devoted himself based on his many years of practical experiences to solve these problems.

SUMMARY OF THE PRESENT INVENTION

The primary object of the present invention is to provide a working height adjustment device of a processing machine to solve the aforesaid problems. The working height adjustment device comprises a retaining frame, a slide seat, and a lever having a connecting rod pivoted between the retaining frame and the slide seat. The slide seat is provided with an adjustment seat. The adjustment seat has an accommodation hole. The accommodation hole is provided with an elastic member, a movable member, and an eccentric rod in sequence. The movable member has an engaging hole. The engaging hole has a diameter greater than that of a micro adjustment screw rod. One inner side of the engaging hole has a toothed portion. Thereby, the eccentric rod is turned to push or release the movable member for the toothed portion of the engaging hole to engage with or disengage from a threaded section of the micro adjustment screw rod, such that the micro adjustment screw rod is tuned or the lever is pulled up and down to adjust the cutter seat quickly to achieve time-saving and convenient effects.

Preferably, a buffer is provided between the retaining frame and the slide seat. The buffer provides a buffering effect when the processing machine is switched to a quick adjustment mode.

DETAILED DESCRIPTION OF THE PREFERRED EMBODIMENT

Figure 1:
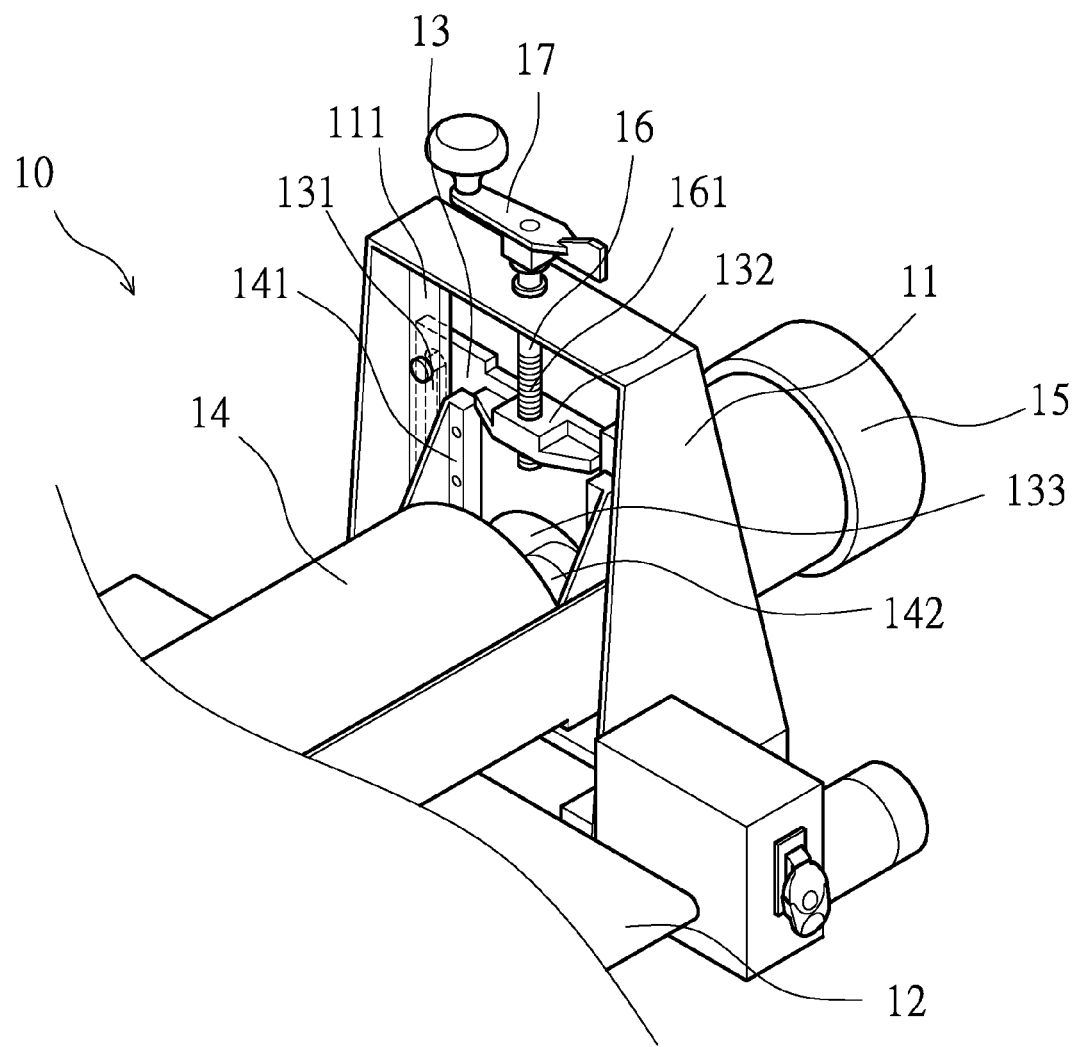
FIG. 1 is a perspective view of a conventional processing machine.

Embodiments of the present invention will now be described, by way of example only, with reference to the accompanying drawings.

Referring to FIG. 2 through FIG. 6, the present invention discloses a processing machine 20. The processing machine 20 comprises a slide seat 23 vertically and slidably mounted to a retaining frame 21. One side of the slide seat 23 is connected with a cutter seat 24, and another opposing side of the slide seat 23 is connected with a motor 25. An upper end of the slide seat 23 is provided with an adjustment seat 232 having a first through hole 235 and a second through hole 236. A micro adjustment screw rod 26 having a threaded section 261 is provided and inserted in the first through hole 235. An upper end of the micro adjustment screw rod 26 extends out of the retaining frame 21 and is pivotally fixed to the retaining frame 21. A rotatable handle 27 is provided on top of the retaining frame 21. An upper edge of the retaining frame 21 is provided with a pivot seat 213. The upper end of the slide seat 23 is provided with a pivotal seat 233. The pivot seat 213 is pivotally connected with one end of a lever 30. One end of a connecting rod 31 is pivotally connected to the pivotal seat 233, and another end of the connecting rod 31 is pivotally connected to the lever 30. The adjustment seat 232 of the slide seat 23 is transversely formed with an accommodation hole 234 in communication with the first through hole 235 and the second through hole 236. The accommodation hole 234 is provided with an elastic member 32 and a movable member 33 in sequence. An eccentric rod 34 is provided and inserted in the second through hole 236 to pass through the accommodation hole 234. An upper end of the eccentric rod 34 is provided with a positioning knob 35. The eccentric rod 34 is tabular and has two flat sides. The movable member 33 has an engaging hole 331 which has a diameter greater than that of the micro adjustment screw rod 26 and corresponds to the first through hole 235. One inner side of the engaging hole 331 has a toothed portion 332. The threaded section 261 of the micro adjustment screw rod 26 passes through the engaging hole 331. One end of the movable member 33 is provided with an axial protruding post 333. The elastic member 32 is fitted on the protruding post 333. Another end of the movable member 33 is provided with an end face 334. The side of the eccentric rod 34 is against the end face 334.

Through the aforesaid device, the positioning knob 35 is turned to turn the eccentric rod 34 for the toothed portion 332 of the engaging hole 331 to engage with the threaded section 261 of the micro adjustment screw rod 26 or the toothed portion 332 to disengage from the micro adjustment screw rod 26. The lever 30 is pulled up and down for the connecting rod 31 to drive the slide seat 23, such that the cutter seat 24 can descended or ascended quickly to save time. The present invention is convenient and practical.

To assemble the present invention, referring to FIG. 2 through FIG. 6, two side protruding boards 211 of the retaining frame 21 each have two bolt holes 212. Bolts are inserted through the bolt holes 212 and rail grooves 231 of the slide seat 23, such that the slide seat 23 is mounted to the side protruding boards 211 and slidable in the direction of the rail grooves 231. A coupling end 241 of the cutter seat 24 and the motor 25 are coupled to the slide seat 23. A turning axle 251 of the motor 25 passes through a penetrating hole 237 of the slide seat 23 to connect with a coupling member 242 of the cutter seat 24 for turning, such that the slide seat 23, the cutter seat 24 and the motor 25 are displaced vertically simultaneously so as to adjust and change the working height between the cutter seat 24 and a working platform 22 for different thicknesses and sizes of wood. For the micro adjustment screw rod 26 to be pivoted to the accommodation hole 214 of the retaining frame 21, the bottom side of the retaining frame 21 is provided with a buckle member 28 so that the micro adjustment screw rod 26 can rotate and won't depart from the accommodation hole 214 of the retaining frame 21. The diameter of the first through hole 235 of the adjustment seat 232 is greater than that of the micro adjustment screw rod 26, so they won't contact with each other. The toothed portion 332 is disposed in the engaging hole 331 and located close to the elastic member 32. In this embodiment, the elastic member 32 is a compression spring. The movable member 33 in the accommodation hole 234 is biased by the elastic member 32, enabling the toothed portion 332 to engage with the threaded section 261 of the micro adjustment screw rod 26 in a micro adjustment state. For controlling the movable member 33 easily, the positioning knob 35 on the eccentric rod 34 is disposed above the retaining frame 21 for the user to turn and switch the positioning knob 35 conveniently from the outside of the retaining frame 21.

Furthermore, the pivotal seat 233 is disposed on the adjustment seat 232 of the slide seat 23 and moved along with the slide seat 23, which functions as a movable pivot. The pivot seat 213 of the retaining frame 21 functions as an immovable pivot. The lever 30 and the connecting rod 31 are pivoted to be a Y-shaped configuration. When they are angled, a relative distance between the ends of the lever 30 and the connecting rod 31 is changed. Therefore, when the lever 30 is pulled up and down, the connecting rod 31 is driven by the lever 30 to move the slide seat 23 up and down. In this way, the slide seat 23 can be displaced rapidly by means of a large route, not ascending/descending slowly by a screwed movement. Thus, the slide seat 23 is controlled to reach a preset position at a very short time to achieve time-saving and convenient effects.

Referring to FIG. 2 through FIG. 6, a square push block 271 is provided underneath the rotatable handle 27, which is turned along with the rotatable handle 27. The opposite sides of the push block 271 may be not parallel and equal to each other. One end of the positioning knob 35 is provided with an extension block 351. Four corners of the square push block 271 have a longer radial length relative to four sides of the push block 271. When the movable member 33 is pushed by the eccentric rod 34, the toothed portion 332 disengages from the micro adjustment screw rod 26 to be in a disengagement state for a quick-adjustment mode. The extension block 351 faces the rotatable knob 27. Thus, when the rotatable knob 27 is turned, the four corners of the push block 271 are configured to push the extension block 351 so as to turn the positioning knob 35, enabling the toothed portion 332 to engage with the micro adjustment screw rod 26 for switching to a micro adjustment mode. The present invention provides an automatic switch effect, without the need for manual operations.

Referring to FIG. 2, FIG. 4, FIG. 5, and FIG. 6, when in use, the operator holds the lever 30. The positioning knob 35 is manually switched to a quick adjustment mode, such that one side of the eccentric rod 34 is pressed against the movable member 33. The elastic member 32 is compressed by the movable member 33, enabling the toothed portion 332 to disengage from the threaded section 261 to be in an disengagement state. The lever 30 is pulled up/down to ascend/descend the slide seat 23 directly until the cutter 24 reaches the working height of a workpiece. Therefore, the height between the cutter seat 24 and the working platform 22 can be adjusted greatly. This action is suitable for a greater difference in thickness and in size between the former wood and the latter wood to be processed.

Referring to FIG. 2, FIG. 7, FIG. 8, and FIG. 9, when the cutter seat 24 reaches a desired height for processing, the rotatable handle 27 is turned immediately. The four corners of the push block 271 are configured to push the extension block 351. The extension block 351 is deflected an angle and the tabular eccentric rod 34 is also deflected. The end face 334 of the movable member 33 is to push the eccentric rod 34 due to the counterforce of the elastic member 32, such that the positioning knob 35 is driven to turn continuously until one of the two flat sides of the eccentric rod 34 is against the end face 34. That is to say, the positioning knob 35 is turned 90 degrees. The movable member 33 is biased by the elastic member 35, enabling the toothed portion 332 to engage with the threaded section 261 of the micro adjustment screw rod 26. After that, the rotatable handle 27 can be used to adjust the slide seat 24 finely for a precise processing height. The present invention can be switched automatically and is time-saving and convenient for use.

This action is suitable for a slight difference in thickness and in size between the former wood and the latter wood to be processed.

Figure 2:
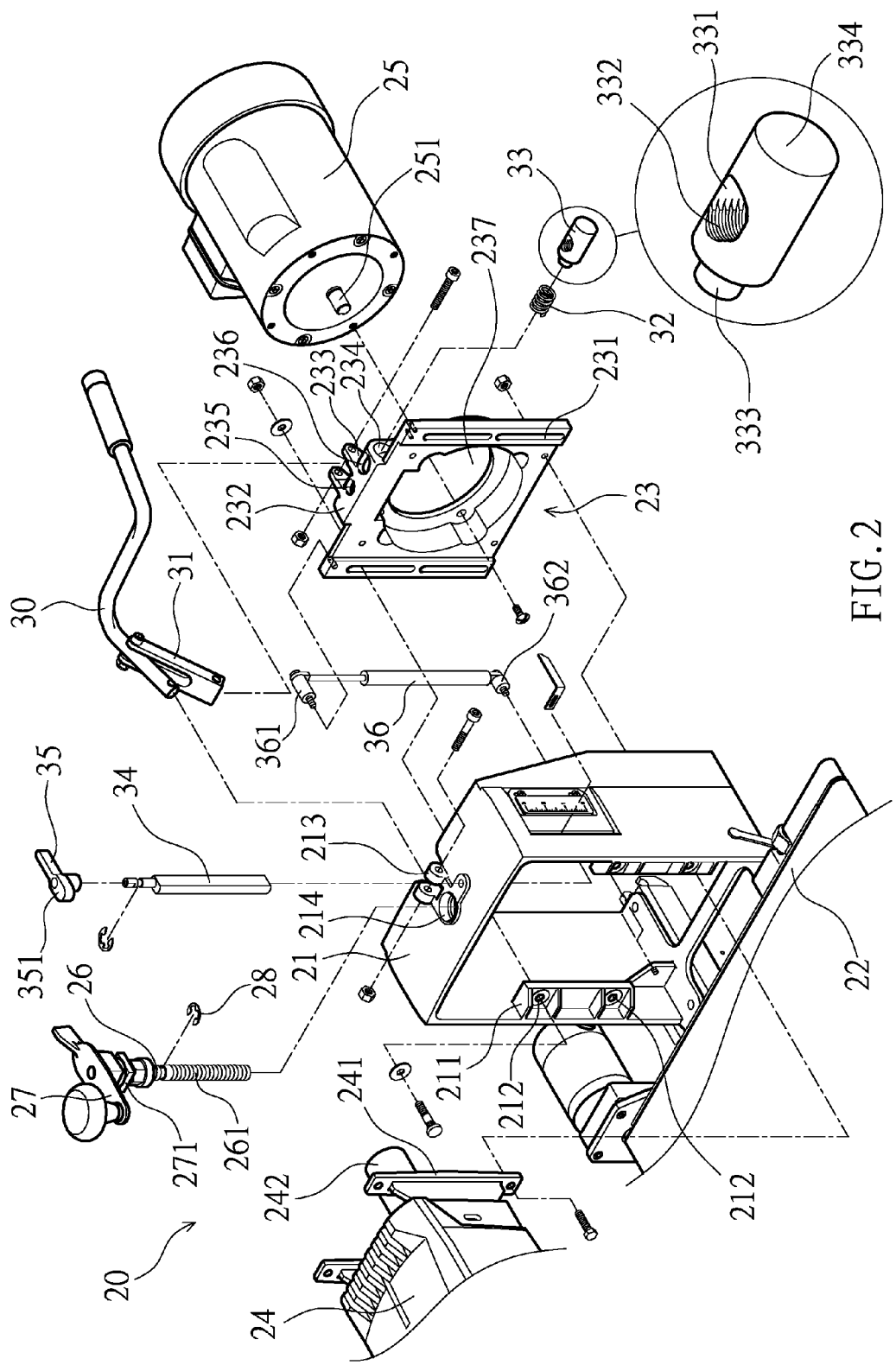
FIG. 2 is an exploded view according to a preferred embodiment of the present invention.
Figure 3:
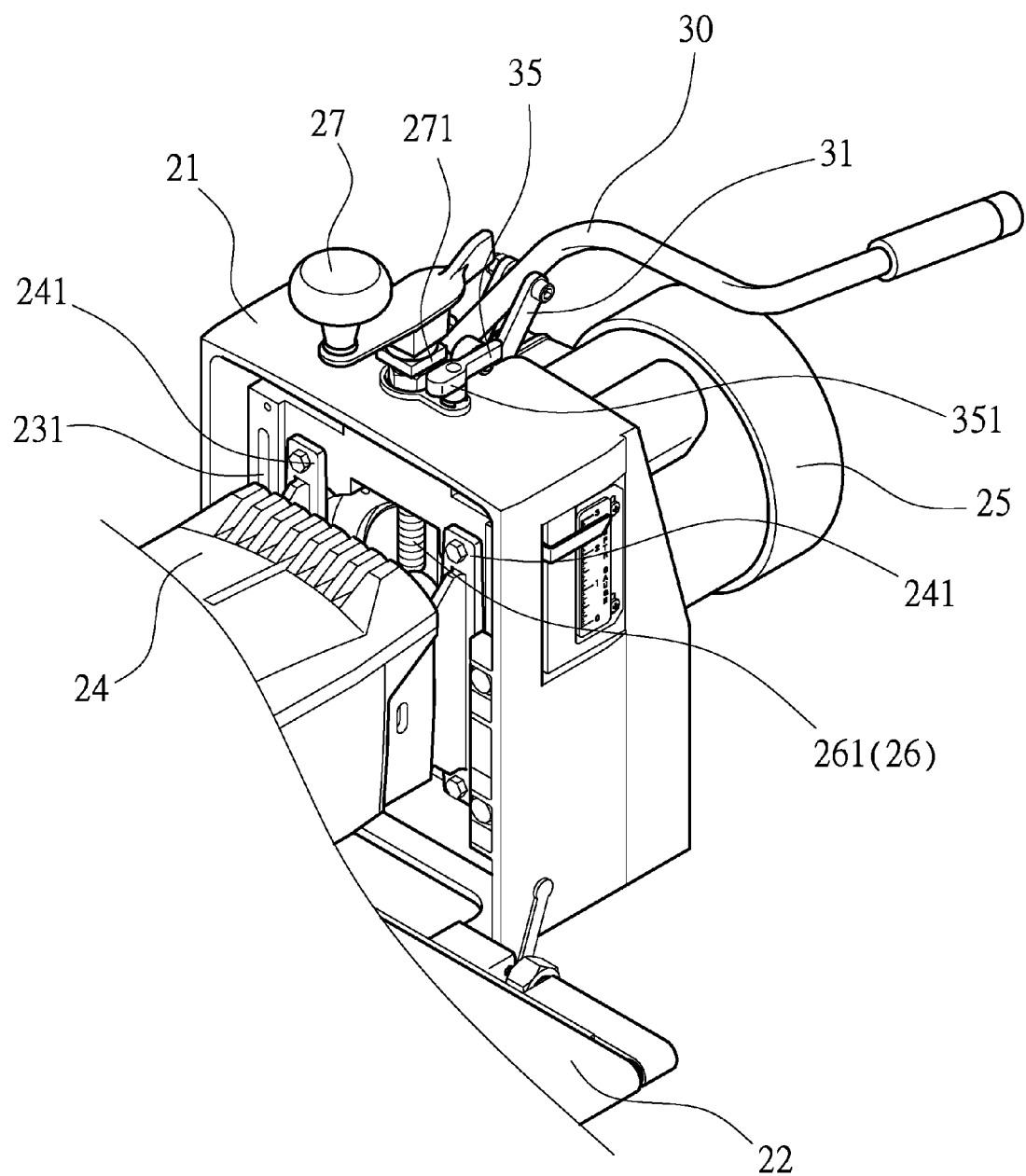
FIG. 3 is a perspective view according to the preferred embodiment of the present invention.
Figure 4:
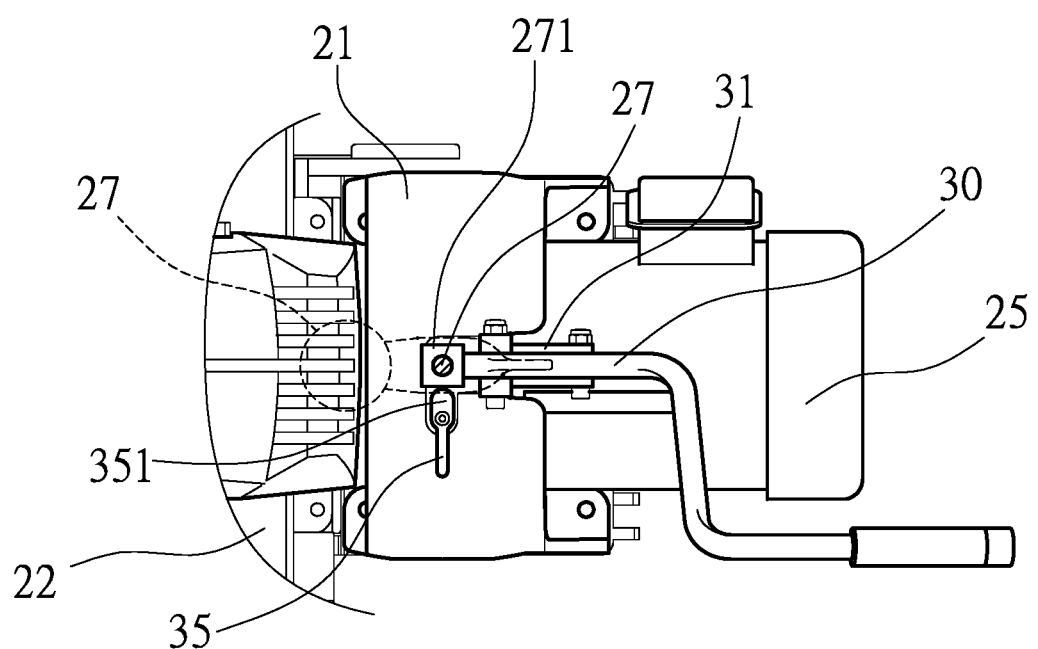
FIG. 4 is a top view showing that the positioning knob is switched for adjusting the cutter seat quickly.
Figure 5:
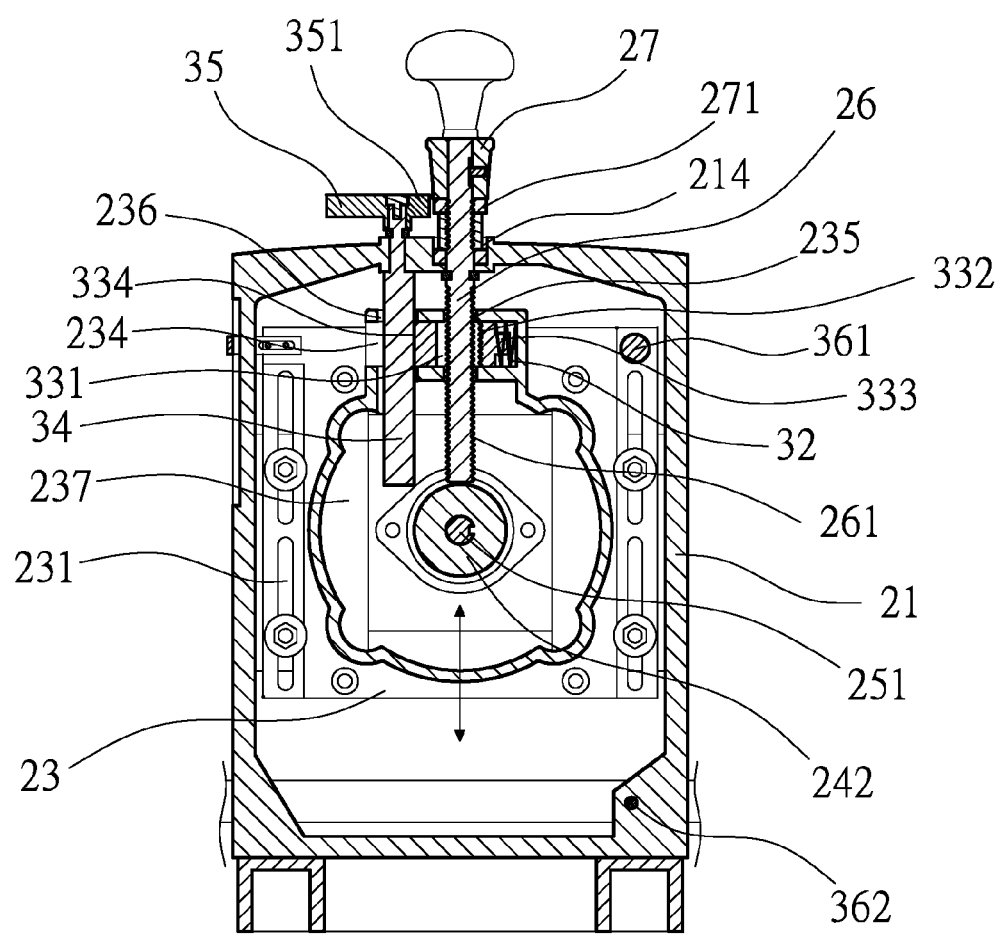
FIG. 5 is a front sectional view showing that the lever is used to adjust the cutter seat quickly.
Figure 6:
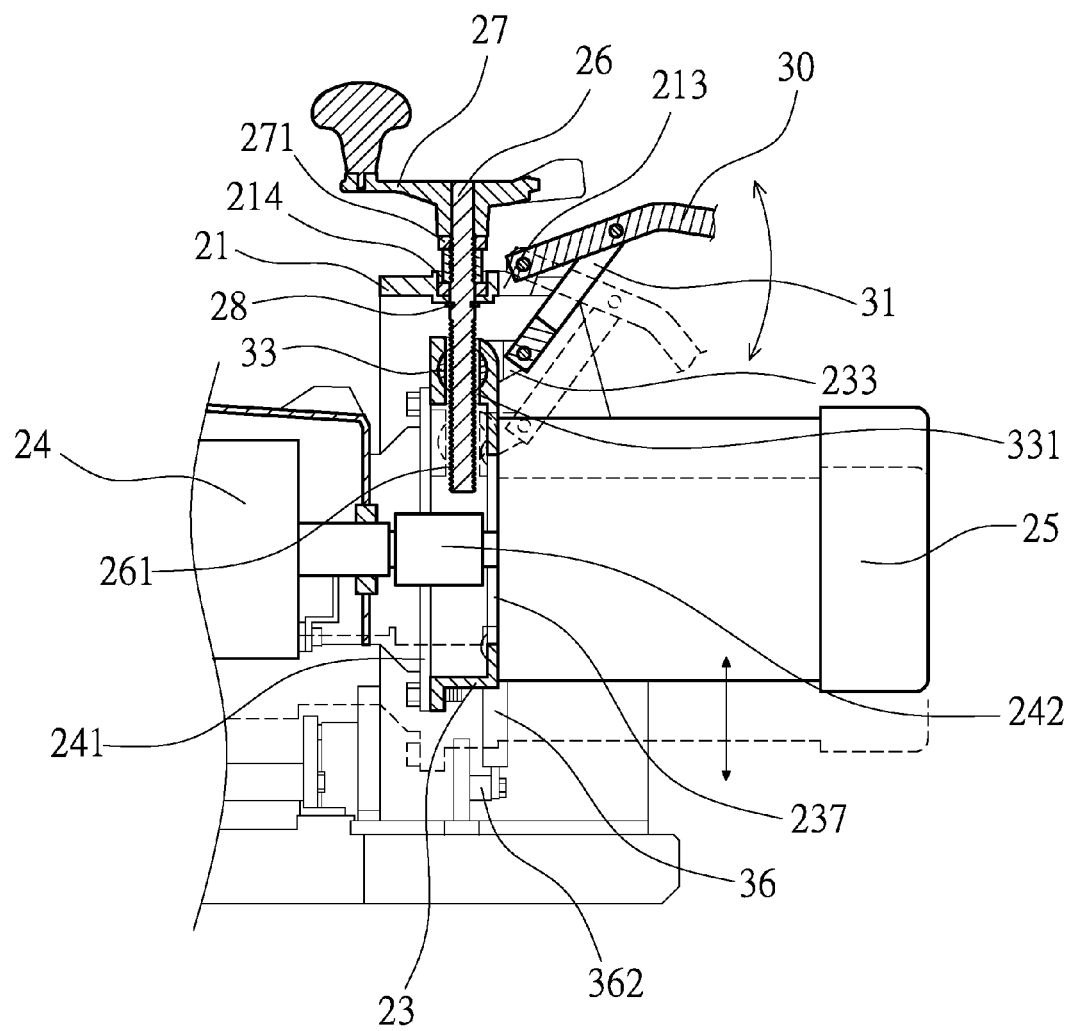
FIG. 6 is a side sectional view showing that the lever is used to adjust the cutter seat quickly.
Figure 7:
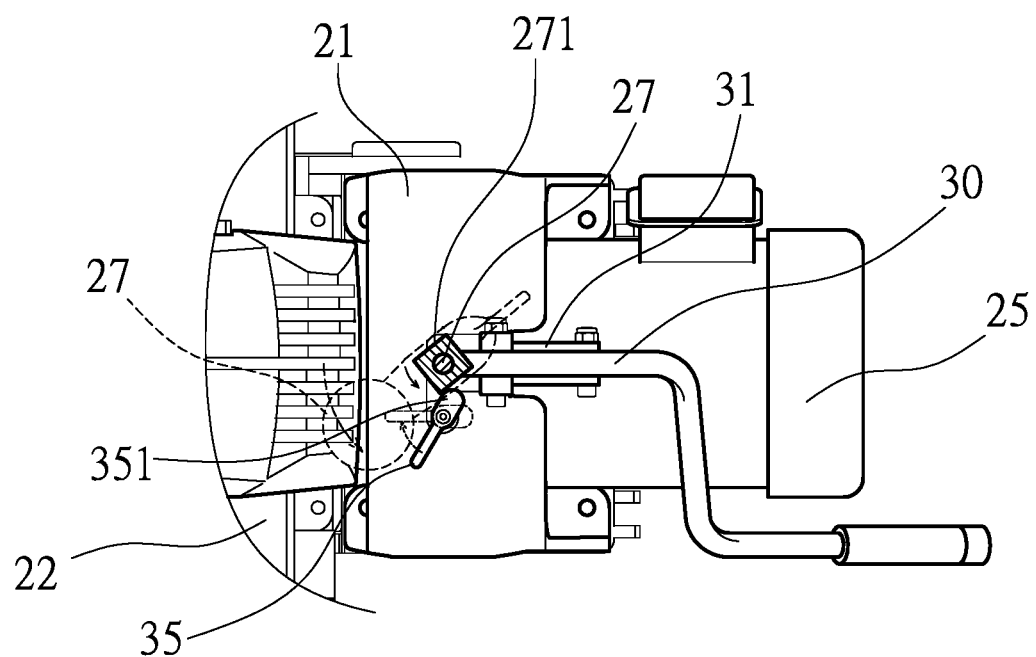
FIG. 7 is a top view showing that the positioning knob is switched for adjusting the cutter seat finely.
Figure 8:
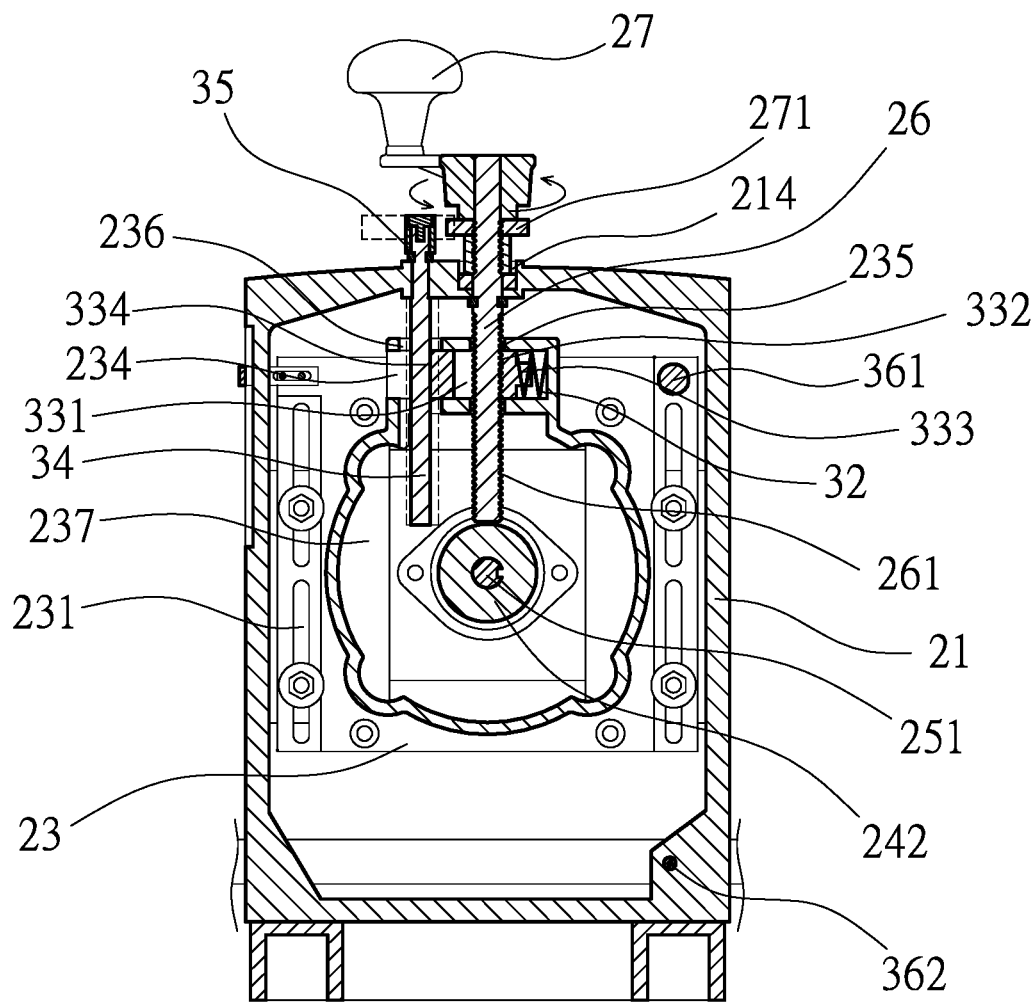
FIG. 8 is a front sectional view showing that the cutter seat is adjusted finely.
Figure 9:
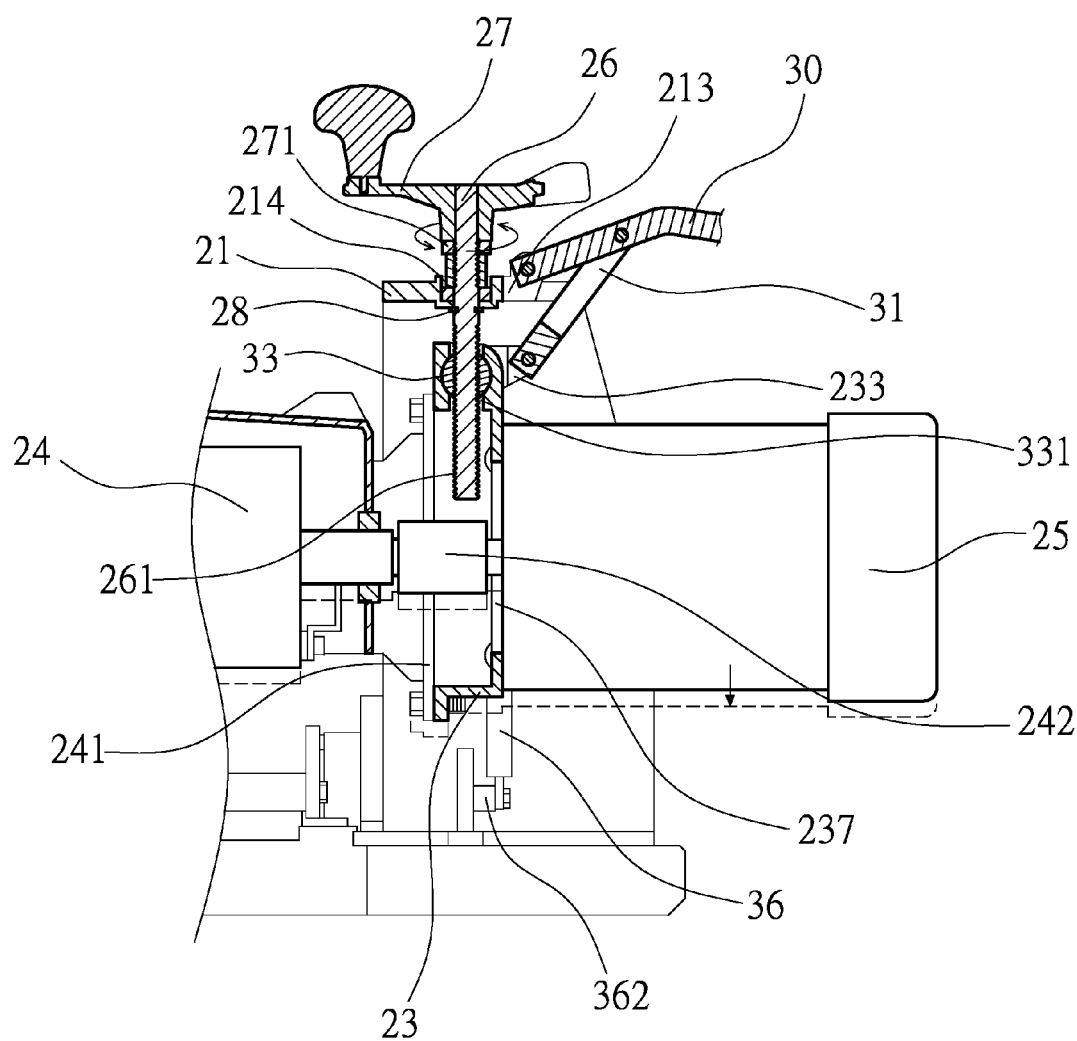
FIG. 9 is a side sectional view showing that the cutter seat is adjusted finely.

Referring to FIG. 2, FIG. 5, and FIG. 6, in another embodiment of the present invention, a buffer 36 is provided between the retaining frame 21 and the slide seat 23. The buffer 36 is disposed vertically. The buffer 36 may be a pneumatic cylinder or a hydraulic cylinder. One end of the buffer 36 is provided with a first fixing pivot 361 which is disposed horizontally, and another end of the buffer 36 is provided with a second fixing pivot 362 which is disposed horizontally. The first fixing pivot 361 is coupled to the slide seat 23. The second fixing pivot 362 is coupled to the retaining frame 23. When the processing machine 20 is switched for a quick adjustment, the buffer 36 provides a buffering effect for the descent of the slide seat 23. In particular, the first fixing pivot 361 is coupled to the upper end of the slide seat 23. The second fixing pivot 362 is coupled to the lower end of the retaining frame 23.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A working height adjustment device of a processing machine, comprising a slide seat vertically and slidably mounted to a retaining frame, one side of the slide seat being connected with a cutter seat, another opposing side of the slide seat being connected with a motor, an upper end of the slide seat being provided with an adjustment seat having a first through hole and a second through hole, a micro adjustment screw rod having a threaded section being provided and inserted in the first through hole, an upper end of the micro adjustment screw rod extending out of the retaining frame and being pivotally fixed to the retaining frame, a rotatable handle being provided on top of the retaining frame, the adjustment seat of the slide seat being transversely formed with an accommodation hole in communication with the first through hole and the second through hole, the accommodation hole being provided with an elastic member and a movable member, an eccentric rod being provided and inserted in the second through hole to pass through the accommodation hole, an upper end of the eccentric rod being provided with a positioning knob, the movable member having an engaging hole, the engaging hole having a diameter greater than that of the micro adjustment screw rod and corresponding to the first through hole, one inner side of the engaging hole having a toothed portion, the threaded section of the micro adjustment screw rod passing through the engaging hole, the elastic member being fitted on one end of the movable member, another end of the movable member being provided with an end face, one side of the eccentric rod being against the end face, wherein the positioning knob is turned to turn the eccentric rod for the toothed portion of the engaging hole to engage with or disengage from the threaded section so as to adjust the height of the cutter seat quickly or finely.

2. The working height adjustment device of a processing machine as claimed in claim 1, wherein a push block is provided underneath the rotatable handle, one end of the positioning knob is provided with an extension block, wherein when the toothed portion disengages from the micro adjustment screw rod, the extension block faces the rotatable knob and the push block is turned to push the extension block, enabling the positioning knob to be turned, so as to turn the eccentric rod for the toothed portion to engage with the threaded section.

3. The working height adjustment device of a processing machine as claimed in claim 2, wherein the push block has a square shape, the push block has four corners, and the corners are configured to push the extension block.

4. The working height adjustment device of a processing machine as claimed in claim 1, wherein the toothed portion is disposed in the engaging hole and located close to the elastic member.

5. The working height adjustment device of a processing machine as claimed in claim 1, wherein the eccentric rod is tabular and has two flat sides.

6. The working height adjustment device of a processing machine as claimed in claim 1, wherein one end of the movable member is provided with an axial protruding post, and the elastic member is fitted on the protruding post.

7. The working height adjustment device of a processing machine as claimed in claim 1, wherein a buffer is provided between the retaining frame and the slide seat.

8. The working height adjustment device of a processing machine as claimed in claim 7, wherein one end of the buffer is provided with a first fixing pivot, and another end of the buffer is provided with a second fixing pivot, wherein the first fixing pivot is coupled to the upper end of the slide seat, and the second fixing pivot is coupled to a lower end of the retaining frame.

* * * * *